United States Patent [19]

Carlier et al.

[11] Patent Number: 4,944,636

[45] Date of Patent: Jul. 31, 1990

[54] METHOD AND DEVICE FOR THE TRANSFERRING AND ACCUMULATING OF PACKING ELEMENTS BY AIR CONVEYING

[75] Inventors: Michel Carlier, Wambrechies; Frederic Bernard, Sailly-Lez-Lannoy, both of France

[73] Assignee: Oerlikon Motch Corporation, Hayward, Calif.

[21] Appl. No.: 241,349

[22] Filed: Sep. 7, 1988

[51] Int. Cl.$^5$ .............................................. B65G 51/02
[52] U.S. Cl. ........................................ 406/72; 406/86
[58] Field of Search ........................ 406/19, 22, 26, 31, 406/86, 88, 72, 147, 176, 181, 183

[56] References Cited

U.S. PATENT DOCUMENTS

| | | | |
|---|---|---|---|
| 3,730,595 | 5/1973 | Yakubowski | 406/72 |
| 4,178,113 | 12/1979 | Beaver et al. | 406/72 |
| 4,822,214 | 4/1989 | Aidlin et al. | 406/88 |

Primary Examiner—Sherman D. Basinger
Assistant Examiner—Stephen P. Avila
Attorney, Agent, or Firm—Patrick J. Walsh

[57] ABSTRACT

A device for the transferring and accumulating of packing elements in the form of a box which is open on one face, using an air conveyor on an accumulating path in a closed loop (1) to which there is connected at least one upstream machine feeding the accumulating path with packing elements and at least one downstream machine fed with packing elements from the accumulating path, characterized by the fact that said closed loop (1) is arranged substantially vertically and comprises an upper horizontal path portion (2), a lower horizontal path portion (3) located below the upper portion, and two curved end connecting portions (4, 5), certain machines being connected to the upper portion of the path and other machines being connected to the lower portion of the path.

10 Claims, 4 Drawing Sheets

METHOD AND DEVICE FOR THE TRANSFERRING AND ACCUMULATING OF PACKING ELEMENTS BY AIR CONVEYING

The object of the present invention is a method and device for the transferring and accumulating of packing elements in the form of a box which is open on one face, using air conveying means, thus permitting the collecting, storing and distributing of the packing elements.

Devices for transfer by air conveying which comprise a conveyor along a path which a packing element must follow are already known, for instance from U.S. Pat. No. 3,953,076 (HURD). The deck plate of the conveyor has perforations and transverse slits. Air of low pressure fed into the conveyor makes it possible to assure the supporting and propulsion of the packing elements to be transported.

Upon the manufacture and assembling of such packing elements one can also use smooth-belt conveyors which provide the connection between the different manufacturing and assembling machines. Means are generally provided for the storage by accumulation of a certain number of packing elements in order to absorb irregularities in operation of the different machines, the speeds of which may be different.

U.S. Pat. No. 3,105,720 (BARKER) shows the application of a transfer by air conveying to such an accumulating device in which the different packing elements are present waiting on a horizontal plate. Accumulating devices which assure the connection between several machines upstream and downstream are already known in which the waiting packing elements are accumulated in a horizontal annular circuit.

These devices of known type take up a large amount of space and their accumulation capacity rapidly proves insufficient in view of the increase in the speeds of the machines. The result is that the machines located upstream and downstream of the accumulating device remain very dependent on each other.

In the event that the packing elements have the shape of a box which is open on one face and that it is necessary to modify the orientation of some of these packing elements before assembly, the known arrangements furthermore have the drawback of requiring complex turning means which further increase the overall size.

The object of the present invention, therefore, is to provide a device for the transferring and accumulating of packing elements which assures a large storage capacity despite being of reduced size and which furthermore permits the automatic turning over of box-shaped packing elements which are open on one face, thus simplifying the connection between the accumulating and storage device and the different upstream and downstream machines.

The device for the transferring and accumulating of packing elements in the form of a box which is open on one face in accordance with the invention employs air-conveying means over an accumulating path in a closed loop to which there are connected at least one upstream machine feeding the accumulating path with packing elements and at least one downstream machine fed with packing elements from the accumulating path. According to the invention, said closed loop is arranged substantially vertically and comprises an upper horizontal path portion, a lower horizontal path portion located below the upper portion, and two curved end connection portions. Certain machines are connected to the upper portion of the path while other machines are connected to the lower portion of the path.

It will be understood that the packing elements are arranged in one direction on the upper portion of the path and upside down around on the lower portion. Under these conditions, it is sufficient to connect one machine at a time to the upper portion of the path and to the lower portion of the path in order automatically to obtain a double feed of packing elements in one direction and the other.

The closed loop is advantageously formed by an air-conveyor which is bounded on its upper face by a perforated wall provided with slits inclined in the direction of transport of the packing elements.

The end connecting portion corresponding to the raising of the packing elements preferably comprises a second air-conveyor arranged inside the loop. It will be noted that this second conveyor can be eliminated, depending on the packing elements to be transported and depending on the difference in level between the upper path portion and the lower path portion.

The packing elements are advantageously of a circular section, the closed loop then having an air-conveying transport apron which is capable of receiving several packing elements side by side without separation other than the end lateral guides. The packing elements are then stocked against each other, their circular section permitting their relative rotation when they enter into contact with each other, the group of packing elements moving continuously over the vertical closed loop of the device of the invention.

In another embodiment, adapted in particular to packing elements of non-circular cross section, the closed loop comprises an air-conveying transport apron and separating and lateral guide means for maintaining the packing elements in at least one row of individual elements. In order to increase the accumulation capacities, several rows are advantageously arranged side by side, the entire group of packing elements moving as previously continuously over the vertical closed loop.

The machines located upstream of the accumulating device of the invention are preferably all connected to the same first horizontal path part of the closed loop. The machines placed downstream of the accumulating device are, on the other hand, advantageously connected both to the said first horizontal path part of the closed loop, thus receiving the packing elements in the position which they occupied upon emergence from the upstream machines, and to the second horizontal path portion of the closed loop, thus receiving the packing elements in turned around position.

The connections to the different machines are also advantageously made by air-conveyors provided with lateral guides which define an individual row of packing elements. The conveyors are suitably inclined to take up any difference in level between the corresponding machine and the horizontal path portion to which they are connected. The connections can be effected without difficulty perpendicular to the path of the closed loop.

The outlet connections for the packing elements are preferably facilitated by providing on the transport apron of the closed loop a certain number of slits which are directed towards the outlet in the vicinity of the outlet connection.

In general, the method of transferring and accumulating box-shaped packing elements which are open on one face in accordance with the invention employs air-conveying means on an accumulation path in a closed loop containing inlet connections and outlet connections. The method of the invention consists in causing the packing elements to move over a substantially vertical path in a closed loop, removing the packing elements which have thus accumulated on the closed loop, both on the upper horizontal path portion and on the lower horizontal path portion, so as automatically to obtain packing elements in one position and packing elements in the turn-over position.

The invention will be better understood from a description of a specific embodiment taken by way of illustration and not by way of limitation, illustrated in the accompanying drawings, in which.

Figure 1:
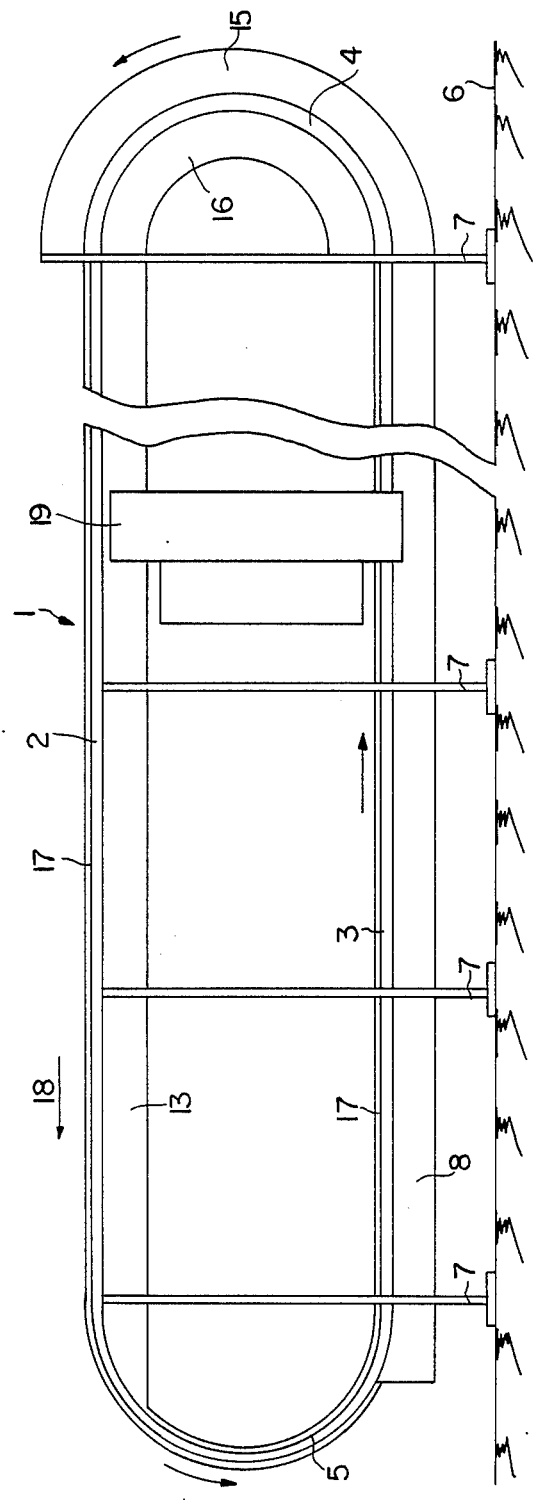
FIG. 1 is a diagrammatic view in elevation of a transferring and accumulating device according to the invention, adapted to open boxes of circular cross section.

As shown in FIGS. 1 to 4, the device of the invention comprises a closed loop, indicated generally as 1, formed by an upper horizontal path portion 2, a lower horizontal path portion 3 connected to the upper portion on one side by a curved connecting portion 4 which permits the raising of the packing elements and on the other side, by a curved end portion 5 which permits their descent. The entire device is simply placed on the floor 6 by means of vertical columns 7. The lower horizontal path 3 is occupied over its entire width and length by an air-conveyor 8 the upper wall 9 of which, which constitutes a transport apron for the packing elements 10, is a flat plate which is provided with transverse slits 11 (FIG. 4) which assure the displacement of the packing element 10 and with perforations 12 which assure the supporting of the packing element 10. A few slits 11 and perforations 12 have been shown diagrammatically in FIG. 4.

The uppr horizontal path 2 is formed in this same way by an air-conveyor 13 whose upper wall has, as in the case of the upper wall 9, a plurality of transverse slits and perforations.

In the ascending connecting portion 4, the device has a first curved outer conveyor 15 and a second curved inner conveyor 16. The path of the packing elements is arranged between the conveyors 15 and 16. Each of these conveyors is separated from the path of the packing elements by a curved plate which follows said path and has perforations and slits for propulsion by the blowing of air.

A plurality of longitudinal guide rods 17 are furthermore provided all around the closed loop 1 above the plates 9 and 14 so as to retain the packing elements 10. It will be noted that the descending end of the connecting portion 5 does not have an air conveyor but merely the curved guided rods 17 in this portion, so that the packing elements simply pass from the upper portion 2 to the lower portion 3 by the force of gravity.

In FIG. 1 arrows 18 indicate the general direction of travel of the assembly of packing elements in the accumulating device of the invention. The same arrow 18 can be noted in FIG. 2.

Figure 2:
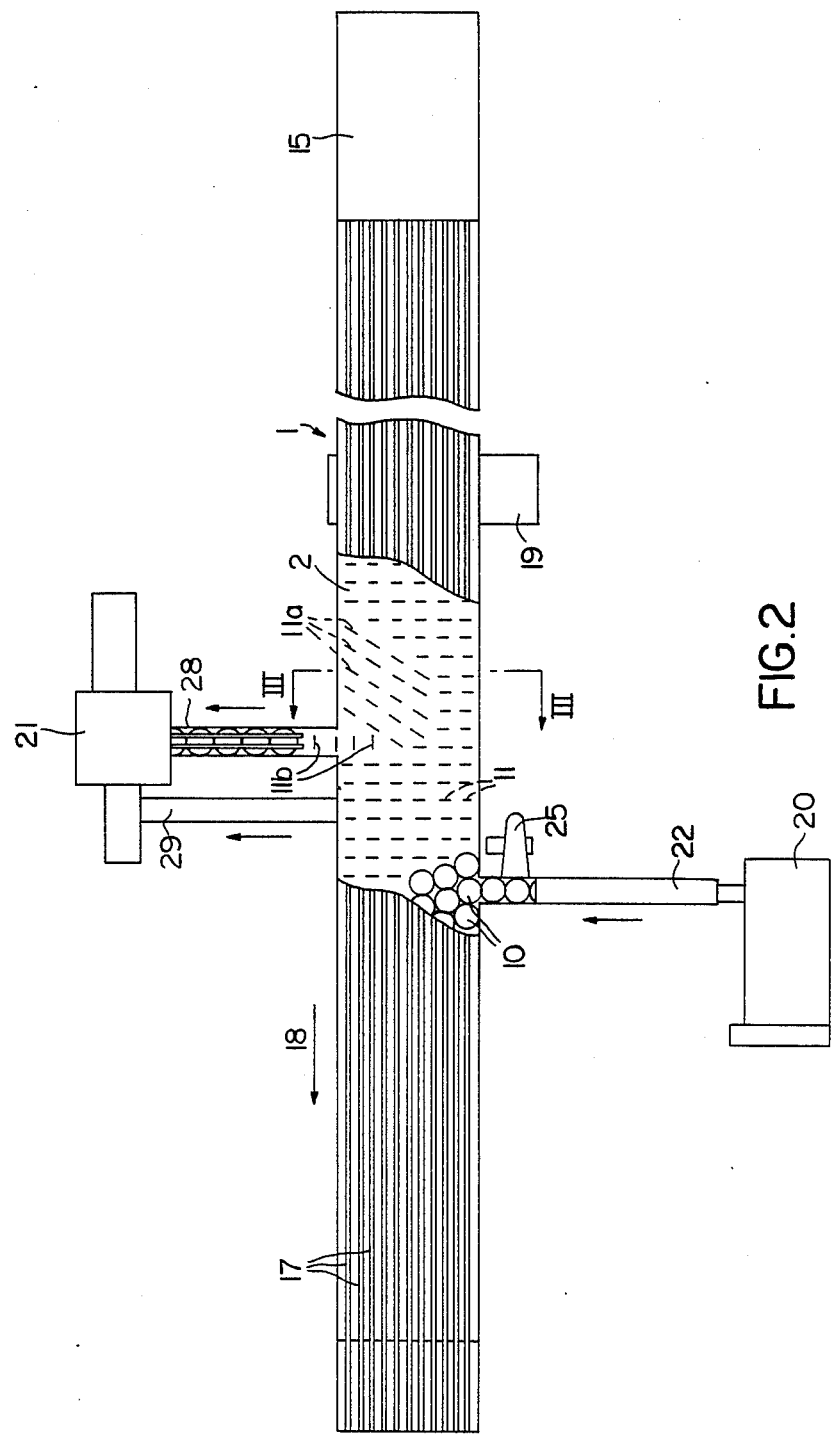
FIG. 2 is a top view of the device of FIG. 1.

In FIGS. 1 and 2 there has also been shown, in very diagrammatic manner, a feed blower 19 for air at low pressure connected to the different supporting and propulsion caissons.

In FIG. 2 there has also been shown diagrammatically, by way of example, an upstream feed machine 20 and a downstream assembling machine 21. The upstream machine 20 which produces, for instance, the packing element 10 is connected to the upper horizontal path portion 2 of the closed loop 1 by a connecting path 22 formed by the upper face of an air conveyor 23 defining an individual row of packing elements 10. The packing elements 10 coming from the machine 20 are transported due to transverse slits provided in the upper face of the air conveyor 23 while being retained by upper guides 24, visible in FIG. 3. In order to take up the difference in level between the machine 1 and the upper path 2, the connecting path 22 permits the ascent of the packing elements 10 under the action of an additional blower 25. Due to this and as can be noted from FIG. 2 and FIG. 3, the packing elements 10 coming from the machine 20 are diverted 90 onto the upper path 2 of the loop where they are then carried along in the direction of the arrows 18 on the transfer plate 14 by the blowing of air coming from the conveyor 13.

Figure 3:
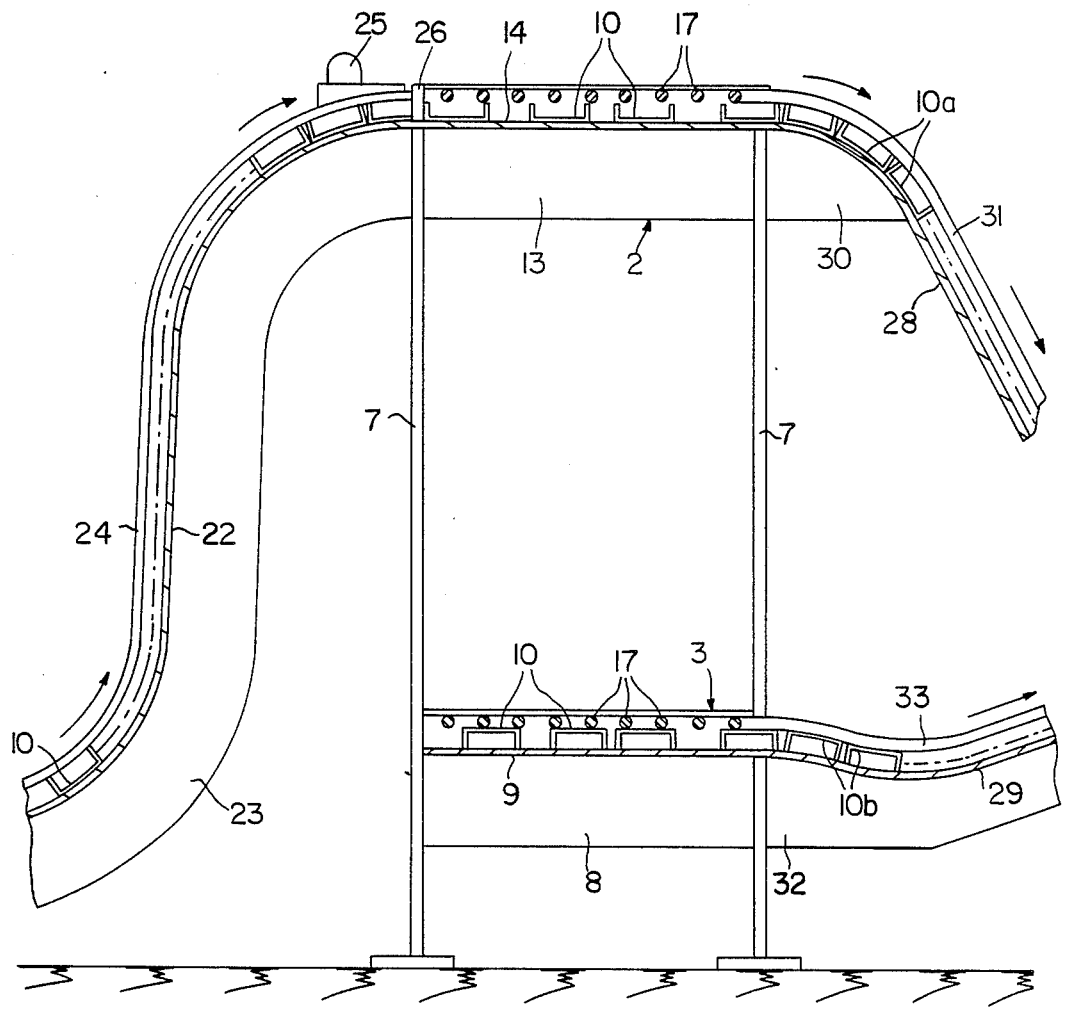
FIG. 3 is a partial enlarged sectional view along the line III—III of FIG. 2.
Figure 4:
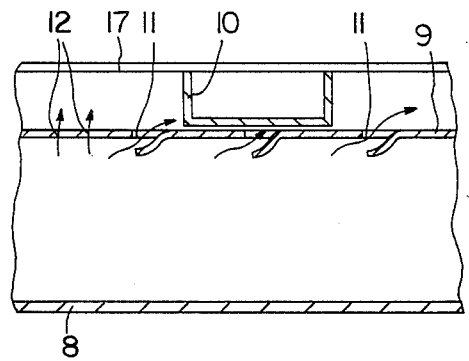
FIG. 4 shows diagrammatically the means for supporting and propelling the packing elements.

The different packing elements are present here in the form of boxes which are open on one face, as can be noted in particular from FIGS. 3 and 4, and are of circular cross section as can be noted from FIG. 2. All of the boxes 10 moving on the closed loop 1 constitute a storage without inner separation, the boxes 2 being able possibly to roll against each other and being simply guided by the rods 17 and by the side walls 26 (FIG. 3).

Figure 5:
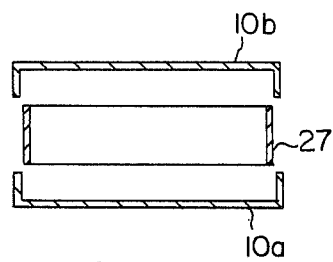
FIG. 5 shows diagrammatically, on a different scale, the assembling of a complete packing from packing elements stored in the device of the invention.

By way of example, FIG. 2 shows a downstream assembling machine 21 which is to receive simultaneously two groups of packing elements 10 one of which is in turned position in order to effect an assembling such as shown in FIG. 5. This assembly is formed by a first packing element 10a forming the bottom of a box, a cylindrical insert 27 and a second packing element 10b which is identical to the element 10a but turned upside down and forms the cover of the box. It is therefore necessary to feed the machine 21 with bottoms 10a and covers 10b.

Due to the arrangement of the vertical closed loop 1 of the accumulator according to the invention, this double feed is effected very simply by means of a first connecting path 28 in communication with the upper path portion 2 and a second connecting path 29 in communication with the lower path 3. The path 28 which defines an individual row of packing elements receives, in the example shown in the drawing, packing elements 10 with the base directed downward, that is to say bottoms 10a, while the connecting path 29 also defining an individul row receives packing elements 10 which are turned around, that is to say constitute covers 10b.

The perpendicular emergence of the packing elements 10 is facilitated by the existence of slits 11a which are slightly inclined in the direction of the connecting paths 28, 29, and slits 11b present in the axis of the connecting paths 28, 29. The packing elements 10 moving in the direction of the arrow 18 therefore have a tendency to be pushed towards the opening connecting the upper path 2 or lower path 3 to the connecting paths 28, 29, which are advantageously perpendicular to the paths 2, 3. The discharge of the packing elements 10 thus takes place automatically without it being necessary to provide other transfer or direction-changing means.

In the example shown in the drawing, the connecting path 28 permits the descent of the bottoms 10a, their discharge being facilitated by a discharge air conveyor 30 (FIG. 3). Upper guide rods 31 prevent the falling of the packing elements upon their descent by gravity in the connecting path 28. The connecting path 29 is directed slightly upward and the movement of the covers 10b takes place by the blowing of air from an air conveyor 32 provided, like the preceding ones, with propulsion slits and support perforations. Guide rods 33 assure the holding of the covers 10b upon their movement on the connecting path 29.

In the example shown in the drawing, the packing elements turn as a whole on the vertical closed loop 1 of the accumulating device, which is possible by reason of their circular cross section. The width of the closed loop 1 can be adapted to the number of machines to be connected and to the desired storage capacity.

In another embodiment in which the articles to be displaced and stored are of a different cross section it would be easy to adapt the device of the invention by separating from each other the different parallel rows of packing elements moving as previously along the vertical path of the closed loop 1.

We claim:

1. A device for the transferring and accumulating of packing elements in the form of a box which is open on one face, comprising an air-conveyor defining an accumulating path in a closed loop (1), at least one upstream machine (20) feeding packing elements to the accumulating path and at least one downstream machine (21) receiving with packing elements from the accumulating path, the closed loop (1) being arranged substantially vertically and including an upper horizontal path portion (2), a lower horizontal path portion (3) located below the upper portion, and two curved end connecting portions (4, 5), certain of said upstream and downstream machines being connected to the upper portion of the path and other said machines being connected to the lower portion of the path.

2. A device according to claim 1, in which the closed loop is formed by an air-conveyor (8, 13) defined on its upper face by a perforated wall (9, 14) provided with slits inclined in the direction of transport of the packing elements.

3. A device according to claim 1 or 2, in which the end connecting portion (4) corresponding to the ascending portion of the connecting elements further includes a second air-conveyor (16) arranged within the loop.

4. A transferring and accumulating device according to claim 1 or 2, in which the packing elements (10) have a circular cross section and that the closed loop (1) comprises an air-conveyor transport apron capable of receiving several packing elements side by side without internal separation.

5. A transferring and accumulating device according to claim 1 or 2, in which the closed loop (1) comprises an air-conveyor transport apron and separating and lateral guidance means for maintaining the packing elements in at least one row of individual elements.

6. A transferring and accumulating device according to claim 1, in which the upstream machines (20) are all connected to the same first horizontal path portion of the closed loop and that the downstream machines (21) are connected both to the said first horizontal path portion of the closed loop, thus receiving the the packing elements (10a) in the position which they occupied upon the emergence from the upstream machines, and to the second horizontal path portion (3) of the closed loop, thus receiving the packing elements (10b) in turned-over position.

7. A device according to claim 6, in which the connections to the different machines are effected by air-conveyors provided with lateral guides which define an individual row of packing elements, the said air conveyors being suitably inclined to take up the difference in level between the corresponding machine and the horizontal path portion to which they are connected.

8. A transferring and accumulating device according to claim 7, in which the connection is effected perpendicularly to the path of the closed loop.

9. A transferring and accumulating device according to claim 7 or 8, in which the discharge connection is facilitated by slits directed towards the outlet in the vicinity of the outlet connection.

10. A method of transferring and accumulating packing elements in the form of a box open on one face, comprising the steps of providing air conveying means on an accumulating path in a closed loop, providing inlet connections and outlet connections, moving the packing elements over a substantially vertical closed-loop path removing packing elements thus accumulated on the closed loop both from the uppr horizontal path portion (2) and from the lower horizontal path portion (3) so as to automatically obtain packing elements in one postion (10a) and packing elements in the turned-over position (10b).

* * * * *